3,242,104
PROCESS FOR POLYMERIZING 1,2-EPOXIDES AND TETRAHYDROPYRANS
Hans Brueschweiler, Basel, and Paul Zuppinger, Arlesheim, Switzerland, assignors to Ciba Limited, Basel, Switzerland, a company of Switzerland
No Drawing. Filed Mar. 13, 1961, Ser. No. 95,013
Claims priority, application Switzerland, Apr. 8, 1958, 58,048
4 Claims. (Cl. 260—2)

This is a continuation in part of application Serial No. 803,071 filed March 31, 1959 now abandoned.

It is known to polymerize tetrahydrofurane alone in the presence of a Friedel-Crafts catalyst or boron trifluoride. However, it is stated in publication Board Report No. 717, page 1060, that it is hardly possible to polymerize tetrahydropyrane under the same conditions.

The present invention is based on the unexpected observation that tetrahydropyrane and substitution products thereof can easily be reacted with epoxide resins in the presence of the hydrates of metal fluorborates or boron trifluoride.

Accordingly, the invention provides hardenable compositions which comprise (1) and 1:2-epoxide compound having a 1:2-epoxide equivalency greater than 1, (2) per each 1,2-epoxide equivalent of the 1:2-epoxide compound (1) 0.01 to 1 mol of a six-membered cyclic compound selected from the class consisting of tetrahydropyranes of the formula

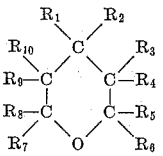

and bis(tetrahydropyranes) of the formula

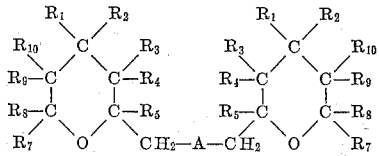

wherein $R_1$, $R_2$, $R_3$, $R_4$, $R_5$, $R_6$, $R_7$, $R_8$, $R_9$ and $R_{10}$ each represent members selected from the class consisting of hydrogen, methyl, hydroxymethyl and methoxymethyl, and A is a bivalent radical obtained by removing terminal hydrogen atoms from two carboxylic groups of a polycarboxylic acid, and (3) per each 1,2-epoxide equivalent of the 1:2-epoxide compound (1) 0.01 to 0.3 mols of boron trifluoride in form of a compound selected from the class consisting of boron trifluoride, hydrates of $BF_3$, complexes of $BF_3$ with amines, complexes of $BF_3$ with aminotriazines, complexes of $BF_3$ with hydrazines, complexes of $BF_3$ with Schiff's bases, metal fluorborates which are soluble in the cyclic ether (2) and hydrates of metal fluorborates which are soluble in the cyclic ether (2).

The invention also provides a process for the manufacture of hardened resins, wherein an epoxide compound (1) and a six-membered cyclic compound (2) are reacted together in the presence of a boron fluoride compound (3) as catalyst in the above specified proportions.

These proportions are critical and are essential features of the invention, since if these proportions are not observed, poorly hardened resins with much inferior technical properties will as a rule be obtained.

The epoxide compounds (1) used in the invention have a 1:2-epoxy equivalency greater than 1.0. By the epoxy equivalency reference is made to the average number of 1:2-epoxy groups (oxirane groups)

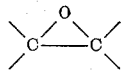

contained in the average molecules of the epoxide compound. Owing to the usual methods of preparation of the epoxide compounds and the fact that they are ordinarily a mixture of chemical compounds having somewhat different molecular weights and contain some compounds wherein the terminal epoxy groups are in hydrated form, the epoxy equivalency of polyepoxy compounds is not necessarily an integer of at least 2, but in all cases it is a value greater than 1.0.

As epoxide compounds (1) of the kind defined above, which are to be reacted with the cyclic ethers (2) there may be mentioned, for example, epoxidated diolefines, dienes or cyclic dienes, such as butadiene dioxide, 1:2:5:6-diepoxy-hexane and 1:2:4:5-diepoxy-cyclohexane; epoxidated polybutadienes, epoxidated diolefinically unsaturated carboxylic acid esters, such as methyl-9:10:12:13-diepoxy stearate; the dimethyl ester of 6:7:10:11-diepoxyhexadecane-1:16-dicarboxylic acid, epoxidated compounds containing two cyclohexenyl radicals, such as vinylcyclohexene dioxide, diethylene glycol bis-(3:4-epoxy-cyclohexane carboxylate) and 3:4-epoxy-cyclohexyl-methyl-3:4-epoxy-cyclohexane carboxylate, limonene dioxide and dicyclopentadiene dioxide.

There may also be used polyglycidyl esters, such as are obtained by the reaction of a dicarboxylic acid with epichlorhydrin or dichlorhydrin in the presence of an alkali. Such polyesters may be derived from aliphatic dicarboxylic acids, such as oxalic acid, succinic acid, glutaric acid, adipic acid, pimellic acid, suberic acid, azelaic acid, sebacic acid and especially aromatic dicarboxylic acids, such as phthalic acid, isophthalic acid, terephthalic acid, 2:6-naphthylene-dicarboxylic acid, diphenyl-ortho: ortho'-dicarboxylic acid, ethylene glycol-bis-(para-carboxyphenyl) ether or the like. There may be mentioned, for example, diglycidyl adipate and diglycidyl phthalate.

There may also be used polyglycidyl ethers such as are obtained by the etherification of a dihydric or polyhydric alcohol or diphenol or polyphenol with epichlorhydrin or dichlorhydrin in the presence of an alkali. These compounds may be derived from glycols, such as ethylene glycol, diethylene glycol, triethylene glycol, propylene glycol-(1:2), propylene glycol-(1:3), butylene glycol-(1:4), pentane-diol-(1:5), hexane-diol-(1:6), hexane-triol-(2:4:6) or glycerine, and especially from diphenols or polyphenols, such as phenol novolacs, cresol novolacs, resorcinol, pyrocatechol, hydroquinone, 1:4-dihydroxynaphthalene, phenol-formaldehyde condensation products, bis - (4 - hydroxyphenyl) - methane, bis - (4-hydroxyphenyl)methylphenylmethane, bis - (4 - hydroxyphenyl)-tolylmethane, 4:4'-dihydroxydiphenyl, bis-(4-hydroxyphenyl)-sulfone and especially 2:2-bis-(4-hydroxyphenyl)-propane. There may be mentioned, for example, ethylene glycol diglycidyl ether and resorcinol diglycidyl ether and also diglycidyl ethers which correspond to the average formula

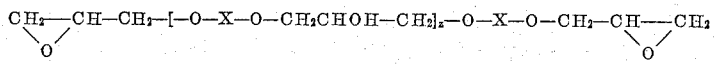

in which X represents an aromatic radical, and Z represents a whole or fractional small number.

There are especially suitable epoxy-resins that are liquid at room temperature, for example, those of 4:4'-dihydroxydiphenyl-dimethylmethane which have an epoxide content of about 3.8 to 5.8 epoxide equivalents per kilogram.

Alternatively, solid epoxy-resins may be used in the molten state or in solution.

As cyclic ethers (2) of the kind defined above there may e.g. be mentioned: tetrahydropyrane, 2-methyl-tetrahydropyrane, 2:2-dimethyl-tetrahydropyrane, 2:2:6-trimethyl-tetrahydropyrane, 2:2:6:6-tetramethyl-tetrahydropyrane, 2-hydroxymethyl-tetrahydropyrane; further the diesters of 2 molecular proportions of 2-hydroxymethyl-tetrahydropyrane or 2-hydroxymethyl-dihydropyrane with 1 molecular proportion of polycarboxylic acid such as oxalic acid, malonic acid, succinic acid, glutaric acid, adipic acid, sebacic acid, azelaic acid, maleic aid, fumaric acid, phthalic acid, terephthalic acid, tetrahydrophthalic acid, tetrachlorophthalic acid, hexahydrophthalic acid, naphthalene dicarboxylic acid, trimellitic acid, pyromellitic acid.

As catalyst (3) boron trifluoride or metal fluorborates which are soluble in the six-membered cyclic compound (2) are used. Suitable metal fluorborates include the fluorborates of lithium, beryllium, zinc, tin, lead, copper, iron, nickel, cobalt, chromium, manganese, magnesium, cadmium, mercury, calcium, strontium, barium and aluminium, vanadium, antimony, cerium, tantalum, lanthanum. The metal fluorborates may be added to the composition either in anhydrous form or in form of their hydrates; zinc fluorborate e.g. forms the stable hydrate

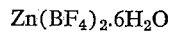

$$Zn(BF_4)_2 \cdot 6H_2O$$

The boron trifluoride may be introduced into the composition in gaseous form or it may preferably be added either in form of its hydrates or in form of its complexes with amines, aminotriazines, hydrazines or Schiff's bases.

Boron trifluoride and water form the stable liquid hydrates $BF_3 \cdot H_2O$ and $BF_3 \cdot 2H_2O$.

The presence of hydrate water exerts the desirable effect to suppress the coagulation which may take place when the epoxide compound is mixed with an anhydrous solution of boron trifluoride or metal fluorborate in the cyclic ether.

If it is desired to use the $BF_3$ or metal fluorborates in form of their hydrates, the preformed hydrate may be directly added to the composition; alternatively the $BF_3$ or metal fluorborate may be added in the anhydrous form, in which latter case the water which is necessary for the formation of the hydrate may either be added as such in any stage of the mixing procedure or it may be present as solute in the cyclic ether (2) in at least the required amount.

Amines, aminotriazines, hydrazines or Schiff's bases will form more or less stable complexes with the boron trifluoride compounds. Suitable nitrogenous bases of the above defined kind include for example ethylamine, ethylene diamine, monoethanolamine, piperidine, triethanolamine, tris(dimethylaminomethyl)phenol, trimethylamine, pyridine and aromatic amines such as bis(p-aminophenyl)methane and bis(p-aminophenyl)sulfone, aniline, toluidine; benzoguanamine; phenylhydrazine; Schiff's bases of aromatic amines with aromatic aldehydes, for example the Schiff's base of aniline with benzaldehyde. When complexes of $BF_3$ with amines or Schiff's bases are used the hardening proceeds exothermically only when heat is supplied, for example, after short heating to about 60° C. and hardening occurs at room temperature only after long standing and without any detectable evolution of heat, which in some cases may be desirable.

The relative proportions of the epoxide compound and cyclic ether may be varied between the limits of 0.01 and 1 molecular proportion of cyclic ether (2) per one epoxide equivalent of the epoxide compound; when the quantity of cyclic ether (2) approaches its lower limit, it is usually of the order of magnitude which is necessary for the formation of a relatively stable complex with the boron trifluoride. This proportion corresponds, for example, generally to an excess of approximately 10 times the stoichiometric quantity of the cyclic ether required for 1:1 complex formation.

Proportions up to 1 mol of the cyclic ether per epoxide equivalent may alternatively be used, but if this upper limit is exceeded, poorly hardened products with inferior mechanical properties will result.

The relative proportions of the epoxide compound and the catalyst may be varied between the limits 0.01 to 0.3 (preferably 0.018 to 0.2) molecular proportions of $BF_3$ per one epoxide equivalent of the epoxide. Proportions of $BF_3$ approaching the lower limit (e.g. 0.018–0.1 mol) are preferred when it is used in form of the hydrate or in form of a metal fluorborate. However, higher proportions of $BF_3$ up to 0.3 mol may conveniently be used, when it is added in form of its complexes with amines or Schiff's bases.

The hardenable composition of the invention may also contain plasticizers or inert diluents. An addition of a plasticizer, such as dibutyl phthalate, dioctyl phthalate, tricresyl phosphate or triphenyl phosphite yields more elastic and more flexible hardened masses.

It may also be of advantage, depending on the properties desired in the hardened resin, to add a diluent or modifying agent which under the action of the metal fluorborate or boron trifluoride reacts with the epoxide resin and takes part in the hardening reaction; thus for example, ethylenically unsaturated polymerizable compounds, such as styrene, monoepoxide compounds, such as cresyl glycide, other cyclic ethers, such as tetrahydrofurane or tetrahydrofurfuryl alcohol, mono- or polyfunctional compounds which contain hydroxyl groups, keto groups, aldehyde groups or carboxyl groups, for example dihydric or polyhydric alcohols, polyglycols and polyesters having terminal hydroxyl or carboxyl groups, can be incorporated into the hardenable compositions of the invention.

There may also be incorporated with the hardenable compositions other additives, such as accelerators, for example, styrene oxide or organic peroxides; pigments, extenders or fillers. As extenders and fillers there may be mentioned, for example, asphalt, bitumen, glass fibers, mica, quartz meal, kaolin or finely divided silicic acid (Aerosil). It may be convenient to work up a solution in the cyclic ether of the boron trifluoride catalyst with the inorganic filler to form a hardener paste, and to mix the latter shortly before use with the epoxide resin or a mixture of the epoxide resin with the cyclic ether.

The compositions of this invention can be used for making rapidly hardening adhesives, laminating resins, lacquers, casting resins and moulding compositions.

Compositions of the invention which contain besides pigments or fillers also plasticizers, are especially suitable for use as mortar-like compositions or putty-like masses.

The following examples illustrate the invention:

*Example 1*

100 grams of a liquid epoxy resin prepared in the known manner by alkaline condensation of 4:4'-dihydroxydiphenyl dimethylmethane and epichlorohydrin (containing 5.1 epoxide equivalents per kg. of resin) are mixed with 5.625 grams of a boron trifluoride hardener solution prepared as described herein below. The mixture hardens at room temperature within 9 to 10 minutes. The resulting casting has the following properties:

Impact bending strength _____ cm. kg./sq. cm __ 7.3
Bending strength _____ kg./sq. mm __ 9.2
Martens value, ° C. _____ 83
Water absorption, percent _____ 0.24

To prepare the boron trifluoride hardener solution 0.625 part of boron trifluoride gas is introduced into 5 parts of tetrahydropyran containing 2% of water (determined by the method according to K. Fischer).

Example 2

100 grams of the liquid epoxy resin used in Example 1 are mixed with a solution of 1 gram of boron trifluoride dihydrate in 20 grams of tetrahydropyrane. The resulting mixture hardens within about 12 hours at room temperature. A casting (60 x 10 x 3 mm.) which has been heated for 72 hours at 100° C. loses 0.19% of its initial weight. This proves that the bulk of the tetrahydropyrane (boiling at 87° C.) reacts with the epoxy resin.

Example 3

A mixture consisting of 88 grams of the liquid epoxy resin used in Example 1 and 12 grams of butyl glycide is mixed with a solution of 0.625 gram of boron trifluoride and 0.1 gram of water in 5 grams of tetrahydropyrane. The mixture has a viscosity of 400 centipoises at 20° C. When the boron trifluoride solution is added to the epoxy resin mixture, hardening at room temperature takes place after 10 minutes. The resulting casting has the following properties:

Impact bending strength _____cm. kg./sq. cm__ 14
Bending strength _____kg./sq. mm__ 11
Water absorption, percent _____ 0.24

Example 4

A paste consisting of 20 grams of tetrahydropyrane, 2 grams of boron trifluoride, 30 grams of ditetrahydrofurfuryl phthalate, 3 grams of dibutyl phthalate, 45 grams of titanium dioxide and 3 grams of finely dispersed silicic acid (trade mark "Aerosil") is thoroughly mixed with 200 grams of a viscous epoxy resin from 4:4'-dihydroxydiphenyl dimethylmethane and epichlorohydrin (containing 4.6 epoxide equivalents per kg. of resin). Strips of sheet aluminum are cemented together with the resulting brushable mass. After 1½ hours the joints are hard and possess a shear strength of 1.13 kg. per sq. mm.

Example 5

2 grams of a boron trifluoride+aniline 1:1 complex are dissolved in 3 grams of pentanediol-1:5 and then mixed with 20 grams of tetrahydropyrane. The resulting hardener solution is thoroughly mixed with 100 grams of a liquid epoxy resin from 4:4'-dihydroxydiphenyl dimethylmethane and epichlorohydrin, containing about 5 epoxide equivalents per kg. of resin. The mass gelatinizes at room temperature within 24 to 30 hours. In a closed mould the mass hardens after having been heated for 5 hours at 60° C. A casting obtained in this manner, heated for 40 hours at 120° C., loses 0.20% of its initial weight.

Example 6

100 grams of the liquid epoxy resin used in Example 1 are mixed with 25 grams of 2-hydroxymethyltetrahydropyrane and with 10 grams of a boron trifluoride hardener solution of 9.1% strength, prepared as described hereinbelow.

A mass is obtained which partially gelatinizes at room temperature within 16 hours. Subsequent hardening for 1½ hours at 60° C. and then for 1 hour at 100° C. produces a casting which has the following properties:

Impact bending strength _____cm. kg./sq. cm__ 1.6
Bending strength _____kg./sq. mm__ 7.9
Cold water absorption (4 days, 20° C.), percent __ 0.81

To prepare the boron trifluoride hardener solution 55 grams of boron trifluoride gas are gradually introduced with cooling into a mixture of 93 grams of aniline and 93 grams of toluene, and the reaction mixture is then dried in a vacuum cabinet (under 20 mm. Hg pressure) at 75° C. for 24 hours until its weight remains constant. Yield: 148 grams of a dry product containing 37.1% of boron trifluoride. 24.6 grams of dry product are then dissolved in 75.4 grams of tetrahydrofurfuryl alcohol so that the boron trifluoride+aniline hardener solution contains 9.1% of boron trifluoride.

Example 7

100 grams of the liquid epoxy resin used in Example 1 are mixed with 20 grams of the diester from 1 mol of maleic acid and 2 mols of 2-hydroxymethyl-tetrahydropyrane and with a solution of 0.625 gram of boron trifluoride in 6 grams of tetrahydropyrane. The mixture hardens within 9 minutes at room temperature with evolution of heat. The hardened, transparent casting has the following properties:

Impact bending strength _____cm. kg./sq. cm__ 13.5
Bending strength _____kg./sq. mm__ 10.0
Cold water absorption (4 days, 20° C.), percent __ 0.19
Martens value (DIN), ° C. _____ 52

Example 8

30 grams of the epoxy resin described in Example 1 are thoroughly mixed with a solution of 0.4 gram of zinc fluorborate dihydrate in 10 grams of tetrahydropyrane.

A resin+hardener mixture is obtained which can be stored at room temperature for over 3 days. In a mould the mixture hardens within 105 minutes at 60° C., and within 1 hour at 120° C., to form a transparent, pale-brownish, hard, impact-resistant casting. When the mixture is poured over a pane of glass and hardened for 1 hour at 60° C. and for 4 hours at 120° C., a clear hard coating is obtained which for a film thickness of 80μ has a Persoz hardness of 409.

Example 9

When the epoxy resin described in Example 1 is replaced by 1:4-butanediol diglycidyl ether, proceeding otherwise as described in Example 8, a resin+hardener mixture is obtained which can be stored for over 3 days at room temperature. In a mould the mixture hardens within 105 minutes at 60° C., and within 1 hour at 120° C., to form a transparent, pale-yellow soft to ductile casting.

When the mixture is poured over a pane of glass and hardened for 1 hour at 60° C. and for 4 hours at 120° C., a clear, elastic coating is obtained which for a film thickness of 132μ has a pendulum hardness according to Persoz of 237.

Example 10

When the epoxy resin described in Example 1 is replaced by vinyl cyclohexene dioxide, proceeding otherwise as described in Example 8, a resin+hardener mixture is obtained which has a pot life of about 10 minutes.

When the mixture is poured over a pane of glass and hardened for 1 hour at 60° C. and for 4 hours at 120° C., a clear coating is obtained which for a film thickness of 85μ has a pendulum hardness according to Persoz of 374.

Example 11

When the process described in Example 12 is performed with tin fluorborate instead of with zinc fluorborate hydrate, a resin+hardener mixture is obtained which has a pot life of about 20 hours; when iron fluorborate is used instead, a pot life of about 20 hours is achieved; when nickel fluorborate is used instead, a pot life of over 2 days is achieved.

To ensure good hardening with the use of lead fluorborate, four times as much thereof is needed as of the other specified metal fluorborates, and in this case a pot life of about 20 hours is achieved.

When the resulting masses are hardened in a mould for 105 minutes at 60° C. and for 1 hour at 120° C., castings are obtained which are very hard and impact-resistant.

When these mixtures are poured over panes of glass and hardened for 1 hour at 60° C. and then for 1 hour at 120° C., coatings are obtained which possess the following hardness according to Persoz:

| Catalyst | Film thickness | Persoz hradness |
|---|---|---|
| Tin fluorborate | 45μ | 392 |
| Iron fluorborate | 55μ | 376 |
| Nickel fluorborate | 85μ | 413 |
| Lead fluorborate | 71μ | 345 |

*Example 12*

100 grams of a phenol novolac polyglycidyl ether which is viscid at room temperature and contains 5.5 epoxide equivalents per kg. of resin (prepared from 1 mol of phenol, 0.5 mol of formaldehyde and 3 mols of epichlorohydrin) are mixed with 10 cc. of 1:4-butanediol diglycidyl ether and 10 grams of tetrahydropyrane, and 5.625 grams of the boron trifluoride hardener solution described in Example 1 are then added.

When poured into a mould, the mixture hardens at room temperature within 30 minutes to form a casting which has a Shore hardness of 97.

*Example 13*

60 grams of the liquid epoxy resin used in Example 1, 40 grams of epoxidized cardanol containing 1.8 epoxide equivalents per kg., and 10 grams of tetrahydropyrane are treated with 7 grams of the boron trifluoride solution described in Example 1. In a mould the mixture hardens at room temperature within 45 minutes to yield a casting having a Shore hardness of 79.

*Example 14*

100 grams of [3:4-epoxy-6-methyl-cyclohexylmethyl]-3:4-epoxy-6-methyl-cyclohexane carboxylate (trademark "EP.201," makers: Messrs. Union Carbide) are mixed with a solution of 4 grams of boron trifluoride+monoethylamine complex in 20 grams of the diester from 1 mol of maleic acid and 2 mols of 2-hydroxymethyltetrahydropyrane.

The mixture hardens within 2 hours at 130° C. to form a casting which has an impact bending strength of 1.5 cm. kg. per sq. cm.

What is claimed is:

1. A process of reacting (1) a 1:2-epoxide compound having more than 1 epoxy group per molecule and having a 1:2-epoxide equivalency greater than 1 with (2) per each 1:2-epoxide equivalent of the 1:2-epoxide compound (1) 0.01 to 1 mol of a six-membered cyclic compound selected from the class consisting of tetrahydropyranes of the formula

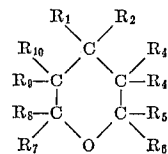

bis(tetrahydropyranes) of the formula

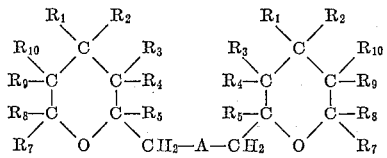

wherein $R_1$, $R_2$, $R_3$, $R_4$, $R_5$, $R_6$, $R_7$, $R_8$, $R_9$ and $R_{10}$ each represent members selected from the class consisting of hydrogen, methyl, hydroxymethyl and methoxymethyl and A is a bivalent radical obtained by removing the terminal hydrogen atoms from the carboxylic groups of a polycarboxylic acid, said compound (2) containing at most one free hydroxy, which comprises contacting (1) and (2) with (3) per each 1:2-epoxide equivalent of the 1:2-epoxide compound (1) 0.01 to 0.3 mols of boron trifluoride in form of a compound selected from the class consisting of boron trifluoride, hydrates of $BF_3$, complexes of $BF_3$ with amines, complexes of $BF_3$ with hydrazines, complexes of $BF_3$ with Schiff's bases of aromatic amines with aromatic aldehydes, metal fluorborates which are soluble in the cyclic ether (2), in which the metal moiety is a member selected from the group consisting of lithium, beryllium, zinc, tin, lead, copper, iron, nickel, cobalt, chromium, manganese, magnesium, cadmium, mercury, calcium, strontium, barium, and aluminum, vanadium, antimony, cerium, tantalum and lathanum, and hydrates of metal fluorborates which are soluble in the cyclic ether (2) and in which the metal moiety is a member selected from the group consisting of lithium, beryllium, zinc, tin, lead, copper, iron, nickel, cobalt, chromium, manganese, magnesium, cadium, mercury, calcium, strontium, barium and aluminum, vanadium, antimony, cerium, tantalum and lanthanum, and curing the reaction product.

2. A process as claimed in claim 1 in which the 1:2-expoxide compound is a polyglycidyl ether of a polyhydric phenol.

3. A process as claimed in claim 1 in which the six-membered cyclic compound (2) is tetrahydropyrane.

4. A process as claimed in claim 1 in which the six-membered cyclic compound (2) is the diester from 1 mol of maleic acid and 2 mols of 2-hydroxymethyl-tetrahydropyrane.

References Cited by the Examiner

UNITED STATES PATENTS

| | | | |
|---|---|---|---|
| 2,462,031 | 2/1949 | Wittcoff | 260—345.9 |
| 2,644,823 | 7/1953 | Kauck et al. | 260—345.1 |
| 2,731,444 | 1/1956 | Greenlee | 260—47 |
| 2,782,233 | 2/1957 | Muetterties | 260—88.3 X |
| 2,824,083 | 2/1958 | Parry et al. | 260—30.4 |
| 2,838,508 | 6/1958 | Ramsden | 260—345.1 |

FOREIGN PATENTS

| | | |
|---|---|---|
| 898,269 | 4/1945 | France. |
| 558,106 | 12/1943 | Great Britain. |

OTHER REFERENCES

"Epon Surface Coating Resins," Shell Chemical Co., SC–48–9, May 1948, p. 24.

WILLIAM H. SHORT, *Primary Examiner.*

HAROLD N. BURNSTEIN, *Examiner.*